(12) United States Patent
Ando et al.

(10) Patent No.: US 8,092,209 B2
(45) Date of Patent: Jan. 10, 2012

(54) IMPRINTING DEVICE

(75) Inventors: Takashi Ando, Hitachi (JP); Noritake Shizawa, Ninomiya (JP); Kyoichi Mori, Oiso (JP); Susumu Komoriya, Tokorozawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 260 days.

(21) Appl. No.: 12/359,402

(22) Filed: Jan. 26, 2009

(65) Prior Publication Data

US 2010/0104682 A1   Apr. 29, 2010

(30) Foreign Application Priority Data

Jan. 30, 2008   (JP) ................ 2008-018481

(51) Int. Cl.
*B29C 59/00* (2006.01)
*B29B 13/08* (2006.01)

(52) U.S. Cl. ............. 425/385; 425/174.4; 264/293

(58) Field of Classification Search .......... 425/174.4, 425/385; 264/293
See application file for complete search history.

(56) References Cited

U.S. PATENT DOCUMENTS

| | | | |
|---|---|---|---|
| 2005/0082698 A1* | 4/2005 | Gutman et al. | 264/1.33 |
| 2005/0134827 A1* | 6/2005 | Box et al. | 355/72 |
| 2005/0172848 A1* | 8/2005 | Olsson | 101/493 |
| 2007/0018360 A1* | 1/2007 | Kolesnychenko et al. | 264/407 |
| 2007/0104813 A1* | 5/2007 | Wuister et al. | 425/174.4 |
| 2007/0141191 A1* | 6/2007 | Kruijt-Stegeman et al. | 425/174.4 |

FOREIGN PATENT DOCUMENTS

| | | |
|---|---|---|
| JP | 2005-108351 | 4/2005 |
| JP | 3889386 | 12/2006 |
| JP | 2007-026589 | 2/2007 |

OTHER PUBLICATIONS

Japanese Office Action dated Jun. 28, 2011 for Application No. 2008-018481 and partial English translation.

* cited by examiner

*Primary Examiner* — Maria Veronica Ewald
(74) *Attorney, Agent, or Firm* — Antonelli, Terry, Stout & Kraus, LLP.

(57) ABSTRACT

An optical imprinting device capable of simultaneously imprinting fine patterns to both surfaces of an opaque substrate is provided. The imprinting device includes a stamper having a fine pattern on its surface to imprint the fine pattern onto a surface of an object to be imprinted by pressing the stamper against the object composed of a substrate and a photo-curing resin layer formed on the substrate. The imprinting device further includes a light source for applying light to the photo-curing resin layer of the object when imprinting the fine pattern of the stamper onto the photo-curing resin layer of the object. The light source applies light to the stamper at a predetermined incident angle to the surface of the stamper.

12 Claims, 6 Drawing Sheets

IMPRINTING DEVICE

CLAIM OF PRIORITY

The present application claims priority from Japanese Patent Application JP 2008-018481 filed on Jan. 30, 2008, the content of which is hereby incorporated by reference into this application.

FIELD OF THE INVENTION

The present invention relates to an imprinting device that imprints a fine relief structure of a stamper to a surface of an object to be imprinted.

BACKGROUND OF THE INVENTION

In recent years, semiconductor integrated circuits have been increasingly microminiaturized and this makes pattern formation for the semiconductor integrated circuits more accurate in photolithography systems, for example. Meanwhile, as the order of the microminiaturization comes close to the wavelength of exposure light sources, the accuracy of the pattern formation has approached the limit. Therefore, electron beam lithography systems, a kind of charged particle beam systems, have been used for higher accuracy in place of the photolithography systems.

However, in pattern formation with the electron beam lithography system, an exposure time (drawing time) of patterns by an electron beam becomes longer as the number of the patterns increases, unlike pattern formation by a one-shot exposure process using an i-line or an excimer laser. Therefore, higher integration of semiconductor integrated circuits lengthens the time for the pattern formation and causes significant throughput degradation.

To enhance the speed of the pattern formation by electron beam lithography systems, cell projection lithography is being developed. In the cell projection lithography, masks in various shapes are combined and an electron beam is applied to them in a lump. However, this method also involves a problem that an Electron beam lithography system used in the cell projection lithography is large and requires an additional mechanism for controlling the mask positions with higher accuracy, increasing the cost of the systems.

As another pattern formation technique, an imprinting technique is known which presses a predetermined stamper to imprint its surface shape. With this imprinting technique, a stamper with relief structure on the surface corresponding to patterns to be formed is pressed against an object to be imprinted, which is made, for example, by forming a resin layer on a substrate. One stamper can be repeatedly pressed against plural pieces of the substrates to be imprinted having a microstructure with projections and depressions at an interval of 50 nm or less. This imprinting technique is considered to apply to formation of recording tracks and bit patterns in large-capacity recording media, for example. Substrates for the large-capacity recording media can be manufactured by etching a substrate using the projections of a pattern formation layer formed by the imprinting technique as a mask.

To form the recording tracks or the bit patterns of the large-capacity recording media, the accuracy of pattern imprinting is important. The imprinting techniques include a thermal imprinting in which thermoplastic resin is applied, and an optical imprinting in which photo-curing resin, which is cured when irradiated with ultraviolet light or the like, is applied. The thermal imprinting involves a heating and cooling process and the patterns goes out of shape owing to thermal expansion or shrinkage of the substrate or stamper. Therefore, the optical imprinting, free from a noticeable affect resulting from temperature change as the thermal imprinting, is suitable for formation of a microstructure of 50 nm or less.

The recording tracks and the bit patterns of the large-capacity recording media are formed on both surfaces of a substrate. Imprinting methods for this formation include a method of forming patterns on one surface at a time, and a method of forming patterns on both surfaces at a time. In the former method, imprinting can be carried out with a conventional system. But, during the imprinting, while one surface of an object to be imprinted is in contact with a stamper, the other surface is in contact with the pressing stage of the system, resulting in contamination of the other surface and loss of the patterns formed on the other surface. Consequently, it is desirable to clamp an object to be imprinted from both sides with stampers and press it as in the latter method.

To cure a photo-curing resin in the optical imprinting, the resin is required to be irradiated with light of a wavelength to which the photoinitiator in the resin reacts. The photo-curing resin is pressed between the stamper and the object to be imprinted. Therefore, if patterns are imprinted to only one surface of the object to be imprinted using a conventional imprinting device, either the stamper or the object to be imprinted should be composed of a transparent body and light is applied to the resin through this transparent body.

With a conventional imprinting device, light can be applied to both surfaces of an object to be imprinted if both the object to be imprinted and stampers are transparent. However, the substrate of the large-capacity recording media is opaque since it is composed of metal, such as aluminum, or has a metal multilayer film on the surface. Therefore, light cannot be applied to the opposite surface of an object to be imprinted to the light source.

To apply light to the opposite surface of the opaque object to be imprinted, a light application mechanism can be installed at the side of the opposite surface of the object to be imprinted. For example, JP-A-2007-026589 discloses a constitution that includes a parabolic reflector plate disposed at the opposite side of the object to be imprinted to the light source in order to reflect light from the light source to the opposite surface of the object to be imprinted. According to this invention, however, a part of a pressing stage, which disposed between the reflector plate and the object to be imprinted, becomes a blind and prevents the entire opposite surface from being irradiated with the light. Japanese Patent No. 3889386 discloses a constitution that includes a light application mechanism disposed at the same height as the surface of the object to be imprinted in order to apply light to the gap between the opaque object to be imprinted and the opaque stamper. However, the gap, which is several nm to several tens of nm, is so small that it is difficult to apply light to the whole surface of the object to be imprinted from the outer edge to the center.

As mentioned above, with a conventional imprinting device, when imprinting patterns on both surfaces of an opaque substrate at a time, it is substantially difficult to apply light to the opposite surface of an object to be imprinted to a light application mechanism.

It is an object of the present invention to provide an optical imprinting device capable of simultaneously imprinting fine patterns to both surfaces of an opaque substrate.

SUMMARY OF THE INVENTION

To achieve the above object, according to a first aspect of the present invention, an imprinting device includes a stamper having a fine pattern on its surface to imprint the fine pattern onto a surface of an object to be imprinted by pressing the stamper against the object composed of a substrate and a photo-curing resin layer formed on the substrate; and a light source for applying light to the photo-curing resin layer of the object when imprinting the fine pattern of the stamper onto the photo-curing resin layer of the object. The light source applies light to the stamper at a predetermined incident angle to the surface of the stamper.

According to a second aspect of the present invention, an imprinting device includes two stampers having fine patterns on surfaces of them to imprint the fine patterns onto both sides of an object to be imprinted by pressing the stampers against the object composed of a substrate and photo-curing resin layers formed on the both sides of the substrate; and plural light sources for applying light to the photo-curing resin layers of both sides of the substrate when imprinting the fine patterns of the stampers onto the photo-curing resin layers of the object. At least one of the light sources applies the light to at least one of the stampers at a predetermined incident angle to the surface of the stamper.

In the present invention, fine patterns mean a relief structure with projections and depressions at intervals of about several nm to 10 μm.

Preferably, the light sources are installed around a periphery of the stamper and at least in two directions.

Preferably, an outside diameter of the stamper is larger than an outside diameter of the substrate, and the light from the light source enters a peripheral portion of the stamper where the substrate and the stamper are not in contact with each other.

The stamper may have a light reflection layer for reflecting the light on a surface of the stamper, and the light reflection layer is provided with the surface opposite to a surface being brought into contact with the substrate.

The stamper may have a light guide layer for guiding the light on a surface of the stamper, and the light guide layer is provided with the surface opposite to a surface being brought into contact with the substrate.

The imprinting device may further include a stage for pressing the stamper against the substrate, and the stage is provided with the surface opposite to a surface being brought into contact with the substrate. The stage may have a light reflection layer for reflecting the light on a surface of the stage.

The stage may have a light guide layer for guiding the light on a surface of the stage.

According to an imprinting device of the present invention, fine patterns can be simultaneously imprinted to both surfaces of an opaque substrate.

BRIEF DESCRIPTION OF THE DRAWINGS

FIG. 9C illustrates a third step of the manufacturing process of the discrete track media in the eighth embodiment.

DETAILED DESCRIPTION OF THE PREFERRED EMBODIMENTS

Embodiments of the present invention will be described with reference to the drawings.

Figure 6A:
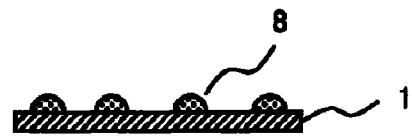
FIG. 6A shows a step of applying a photo-curing resin to a surface of an object to be imprinted in a conventional process.
Figure 6B:
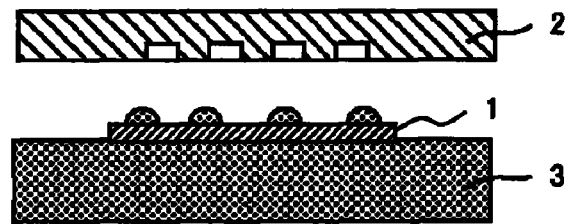
FIG. 6B shows a step of setting the object to be imprinted on a pressing stage in a conventional process.
Figure 6C:
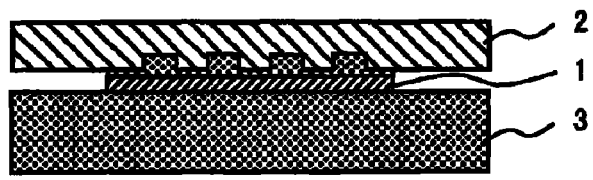
FIG. 6C shows a step of pressing the stamper and the object to be imprinted against each other in a conventional process.
Figure 6D:
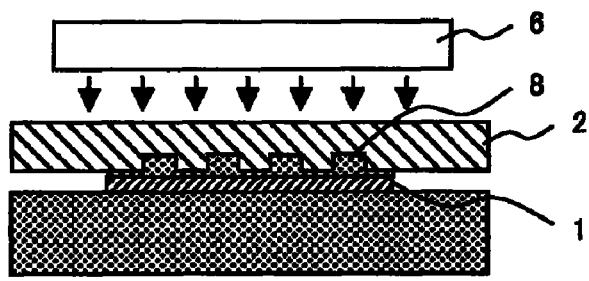
FIG. 6D shows a step of curing the photo-curing resin by irradiating the resin with ultraviolet light through the stamper in a conventional process.
Figure 6E:
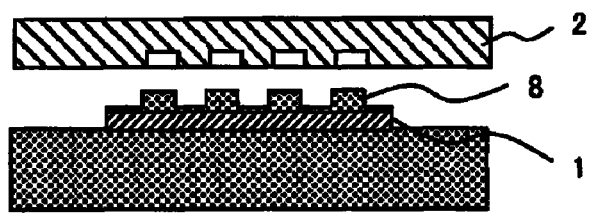
FIG. 6E shows a step of releasing the stamper from the object to be imprinted in a conventional process.
Figure 6F:
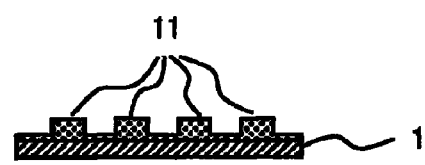
FIG. 6F shows fine patterns on the object to be imprinted in a conventional process.

Before an imprinting device in accordance with an embodiment of the present invention is described, a conventional basic process for imprinting patterns only to one surface of a substrate is described. FIGS. 6A to 6F illustrate a basic process of optical imprinting. FIG. 6A shows a step of applying a photo-curing resin 8 to a surface of an object to be imprinted 1. The photo-curing resin 8 is resin material containing a photosensitive substance, for example. FIG. 6B shows a step of setting the object to be imprinted 1 on a pressing stage 3 of a pressing mechanism. FIG. 6C shows a step of pressing the stamper 2 and the object to be imprinted 1 against each other after exposing the surface of the object to be imprinted 1 and the surface of a stamper 2 to be in contact with the surface of the object to be imprinted 1 to an atmosphere at the atmospheric pressure or less. FIG. 6D shows a step of curing the photo-curing resin 8 by irradiating the resin 8 with ultraviolet light through the stamper 2 from an UV (ultraviolet) light source 6 installed opposite side of the object to be imprinted 1. FIG. 6E shows a step of releasing the stamper 2 from the object to be imprinted 1 after the photo-curing resin 8 is cured. FIG. 6F shows fine patterns 11 on a thin film layer as a base, imprinted to the surface of the object to be imprinted 1. In this conventional imprinting method, if the stamper 2 and the object to be imprinted 1 are transparent, the opposite surface of the object to be imprinted 1 (and the pressing stage 3) can also be irradiated with the ultraviolet light from the UV light source 6. If the object to be imprinted 1 is opaque, the opposite surface of the object to be imprinted 1 is not irradiated with the ultraviolet light.

Figure 1:
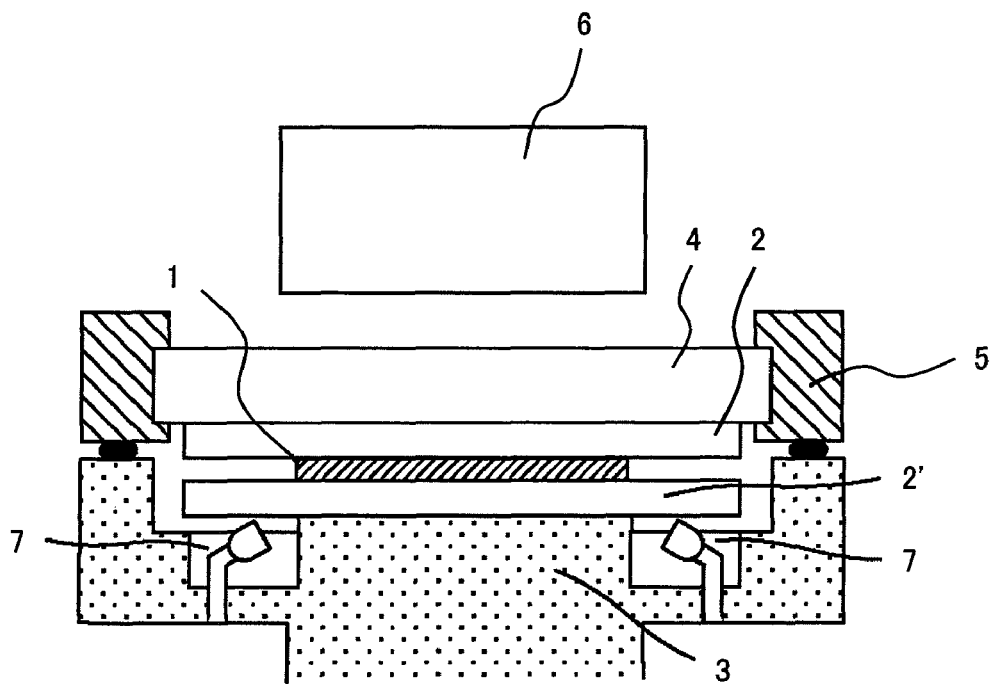
FIG. 1 is a schematic diagram of an imprinting device in accordance with a first embodiment of the present invention.

FIG. 1 illustrates a mechanism of the imprinting device of the present invention that simultaneously imprints patterns on both surfaces of an opaque substrate. An opaque object to be imprinted 1 that does not transmit the ultraviolet light is disposed between two transparent stampers 2, 2'. A photo-curing resin is applied to both surfaces of an object to be imprinted 1 in advance. The surfaces (top surfaces) of the stampers 2, 2 with fine patterns are formed on them face the surfaces of the object to be imprinted 1. The stamper 2' is disposed on a pressing stage 3 and its diameter is larger than the diameter of the object to be imprinted 1. The stamper 2 is fixed on a transparent backup plate 4 disposed over the object to be imprinted 1. A holder 5 holds the backup plate 4. The holder 5 and the stage 3 form a chamber for exposing the surfaces of the object to be imprinted 1 and the stampers 2, 2' to a vacuum atmosphere. A UV light source 6 is disposed over the backup plate 4 and radiates ultraviolet rays to the object to be imprinted 1 and the stamper 2. The stage 3 equips light sources 7 for radiating ultraviolet light, which is guided through a fiber, to the top surface of the stamper 2' obliquely. The ultraviolet light radiated to the stamper 2' is guided and scattered through the stamper 2', illuminating between the object to be imprinted 1 and the stamper 2'. The imprinting device of the present invention makes it possible to apply the ultraviolet light to both surfaces of the opaque object to be imprinted 1 while simultaneously pressing the stampers 2, 2' against each surface of the object to be imprinted 1, imprinting fine patterns to both surfaces of the object to be imprinted 1.

The object to be imprinted 1 in this embodiment is coated with a photo-curing resin that forms imprinting patterns as described later. This photo-curing resin is composed of known resin material containing a photosensitive substance. Examples of such resin material include material predominantly composed of cycloolefin polymer, polymethyl methacrylate, polystyrene polycarbonate, polyethylene terephthalate (PET), polylactic acid, polypropylene, polyethylene, or polyvinyl alcohol.

Methods to coat the resin include a dispense method and a spin coat method. In the dispense method, a resin is dropped onto the surfaces of the object to be imprinted 1. When the stampers 2, 2' are brought into contact with the object to be imprinted 1, the dropped resin is spread over the surfaces of the object to be imprinted 1. If the resin is dropped at multiple locations on the object to be imprinted 1, the distances between the centers of the locations should be larger than the diameter of each droplet of the resin.

Preferably, the spread of the resin corresponding to fine patterns to be formed is evaluated beforehand and the location where the resin is dropped should be determined based on the result of the evaluation. The quantity of a drop of the resin is adjusted to be equal to or larger than the quantity of the resin required for forming the imprinting patterns. The location of a drop of the resin is also adjusted.

In the spin coat method, the spin rotation speed and the viscosity of the resin are adjusted so that the quantity of the resin is equal to or larger than the quantity of the resin required for forming the imprinting patterns.

The object to be imprinted 1 in the present invention can include various processed materials composed of, for example, silicon, glass, aluminum alloy, and resin as well as the above-mentioned materials for the object to be imprinted 1. The object to be imprinted 1 may have a multilayer structure with a metal layer, a resin layer, an oxide film layer, or the like formed on its surface.

A low transmittance for the ultraviolet light of the object to be imprinted 1 enhances the advantage of this embodiment. For example, this embodiment is effective for materials that have a transmittance of 50% or less for ultraviolet light with a wavelength of 365 nm.

The outside shape of the object to be imprinted 1 may be circular, oval, or polygonal, depending on the intended purpose of the object to be imprinted 1. The object to be imprinted 1 may have a hole at the center.

As mentioned above, the stampers 2, 2' have fine patterns to be imprinted to the object to be imprinted 1. Examples of a method for forming projections and depressions composing the fine patterns on the surfaces of the stampers 2, 2' include photolithography, focused ion beam lithography, and electron beam lithography. Any of these methods can be used according to the processing accuracy of fine patterns to be formed. In this embodiment, the material for the stampers 2, 2' is transparent because the photo-curing resin applied to the object to be imprinted 1 is irradiated with the ultraviolet light through the stampers 2, 2'. Preferably, the material should have a transmittance of 50% or more for light with the wavelength to cure the photo-curing resin.

Examples of material for the stampers 2, 2' include a transparent material, such as glass, and resin. The outside shape of the stampers 2, 2' may be circular, oval, or polygonal, depending on the pressing method. The stampers 2, 2' may have a hole at the center. A release agent of fluorine, silicone, or the like may be applied to the surfaces of the stampers 2, 2' to facilitate releasing of the photo-curing resin 2 from the stampers 2, 2'.

A larger diameter of the stampers 2, 2' than the diameter of the object to be imprinted 1 makes it easier to receive the ultraviolet light from the UV light sources, described below.

A sufficiently larger thickness of the stampers 2, 2' than the wavelength of the ultraviolet light makes it possible for the ultraviolet light to propagate and diffuse as in free space, suppressing interference of the ultraviolet light in the stampers. It is preferable that the thickness of the stampers should be larger by at least 1000 times than the wavelength of the ultraviolet light required for curing the photo-curing resin.

The number of the light source 6 for applying the ultraviolet rays can be one as long as its spot diameter is enough large to cover the entire surface of the object to be imprinted 1. If the spot diameter is smaller than the entire surface of the object to be imprinted 1, two or more light sources are installed and activated to irradiate the entire surface of the object to be imprinted 1.

It is preferable to adjust the projecting direction of the light sources 7 for applying the ultraviolet rays so that the ultraviolet light can be applied to the surface of the stamper at an arbitrary incident angle. In this embodiment, it is preferable that the angle of projection from the light sources 7 should be set within the range of 1 degree to 45 degrees to the surface of the stamper according to the position of the UV light source.

The ultraviolet light may be applied from the side of the stamper 2'. In this case, it is preferable that the side surface of the stamper 2' should be mirrored surface and the incident angle of the ultraviolet light should be set within the range of 0 degree to 10 degrees to the surface of the stamper.

The light sources 7 for applying the ultraviolet rays, which introduce ultraviolet light through a fiber, may have a light-emitting element, such as a laser diode, at the bottom or side wall of the stage 3.

The light sources 7 for applying the ultraviolet rays project the ultraviolet light from the outer edge to the center of the stamper 2'. The light sources 7 installed in at least two positions can irradiate the entire surface of the object to be imprinted 1 with the ultraviolet rays.

The stamper 2' may include a reflecting layer to enhance the reflectance of the ultraviolet rays on the surface which does not come into contact with the object to be imprinted 1. Examples of such a layer include a multilayer film composed of aluminum or dielectric.

The stamper 2' may include a layer to guide the ultraviolet rays on the surface which does not come into contact with the substrate. One of the examples of such a layer is a waveguide layer composed of dielectric.

Any material can be used for the stage 3 as long as it can withstand pressure required for pressing the stampers against the object to be imprinted 1. Examples of a possible material include copper, brass, and stainless steel.

The stage 3 may include a reflecting layer to enhance the reflectance of the ultraviolet rays on the surface. Examples of such a layer include a multilayer film composed of aluminum or dielectric.

The stage 3 may include a layer to guide the ultraviolet rays on the surface. One of the examples of such a layer is a waveguide layer composed of dielectric.

In the above description, the ultraviolet light is applied to both surfaces of the object to be imprinted 1. The ultraviolet light can be applied to only one of the surfaces in this embodiment. For example, in a configuration where the stamper 2' and the opaque object to be imprinted 1 are placed on the stage 3 in this order in FIG. 1, if the stamper 2' is transparent, fine patterns can be imprinted to the bottom surface of the object to be imprinted 1.

The object to be imprinted 1 with imprinted fine patterns in this embodiment can be applied to information storage media, such as magnetic recording media and optical recording media. This object to be imprinted 1 is also applicable to large-scale integrated circuit components, optical components including lenses, polarizing plates, wavelength filters, light-emitting elements, and optical integrated circuits, and biodevices including immune assay, DNA separation, and cell culturing.

The present invention is more specifically described below by giving Examples.

First Embodiment

In the first embodiment, description will be given to a method for imprinting fine patterns to both surfaces of an opaque object to be imprinted using the imprinting device illustrated in FIG. 1.

The imprinting device of the first embodiment includes the stage 3 that is made of stainless steel, movable up and down, and has a mirrored surface. The stage 3 has an aluminum layer with thickness of 1 μm on the outermost surface and a $SiO_2$ layer with thickness of 3 nm on the aluminum layer as a protective film. The stamper 2' made of quartz was placed on the stage 3. The stamper 2 made of quartz was fixed on the backup plate 4 made of quartz. The object to be imprinted 1 was disposed between the stamper 2 and the stamper 2'.

In the first embodiment, the object to be imprinted 1 was a substrate for magnetic recording media with diameter of 65 mm and thickness of 0.631 mm, having a hole at the center with diameter of 20 mm. The substrate was made of glass and opaque with a magnetic recording layer was formed on the surface.

The stampers 2, 2' were quartz substrates with outermost diameter of 100 mm and thickness of 2 mm. Groove patterns were formed in the pattern formation region of each stampers 2, 2', extending from 23 mm to 63 mm in diameter. The groove patterns, 2 μm in width, 4 μm in pitch, and 80 nm in depth, were concentrically formed by photolithography to have the common central axis with the center hole of the object to be imprinted 1.

The stage 3 equips six UV light sources 7 for applying ultraviolet light from the outer edge of the stamper 2'. The UV light sources 7 irradiates the stamper 2' with light of 365 nm that is projected from a laser diode, not shown in FIG. 1, through a fiber and a lens system. A lens unit, 4 mm in spot diameter and 15 mm in focal length, was attached at the tip of each UV light source 7. The six UV light sources 7 were disposed at intervals of 60 degrees to encircle the object to be imprinted 1.

The UV light source 6 was disposed over the backup plate 4 for applying ultraviolet light to a surface of the object to be imprinted 1 through the stamper 2. The UV light source 6 had the irradiation area of 80 mm in diameter and was capable of irradiating the entire surface of the object to be imprinted 1 at one time.

A resin was dropped onto both surfaces of the object to be imprinted 1 by the dispense method. The resin was an acrylate resin containing a photosensitive substance and was prepared to have 4 MPa·s of viscosity. The resin was applied by an application head that had 512 nozzles (256 nozzles were arranged in two rows) and discharged the resin by a piezo method. The interval of the nozzles of the application head was 70 μm in the direction of rows and 140 μm between the rows. The application head was controlled to discharge approximately 5 pL of the resin from each nozzle.

The discharge positions were determined based on a spread of one drop of the resin created by pressing the stamper 2 or 2' against the object to be imprinted 1. When the resin was dropped onto the surface of the object to be imprinted 1 and the stamper 2 was pressed against the object to be imprinted 1, the resin was elliptically spread with about 140 μm in the direction perpendicular to the groove patterns (the direction of the radius of the object to be imprinted 1) and about 850 μm in the direction parallel to the groove patterns (the direction of the circumference of the object to be imprinted 1). As a result, the dropping pitch of the resin was determined to be 80 μm in the radial direction and 510 μm in the circumferential direction within the range of 20 mm to 25 mm in the diameter.

The object to be imprinted 1 was placed between the stamper 2' and the stamper 2. The object to be imprinted 1 was held by a holding mechanism, not shown in FIG. 1, so that the surfaces of the object to be imprinted 1 were not in contact with the stamper 2' or the stamper 2. After the atmosphere in the chamber formed by the stage 3 and the holder 5 was depressurized, the stage 3 was moved up to clamp and press the object to be imprinted 1 with the stamper 2, 2'. In this state, UV light was projected from the UV light sources 7 disposed behind the stamper 2' and the UV light source 6 disposed above the backup plate 4. The photo-curing resin on both surfaces of the object to be imprinted 1 was cured by the UV light. After the resin was cured, the stamper 2 and the stamper 2' were released from the object to be imprinted 1 in this order. Thus the object to be imprinted was manufactured with groove patterns on both surfaces of it. The groove patterns had a width of 2 μm, a pitch of 4 μm, and a depth of 80 nm, corresponding to the fine patterns formed on the surfaces of the stampers 2 and 2'.

In the first embodiment, the aluminum layer of 1 μm in thickness was formed on the outermost surface of the stage 3 and the $SiO_2$ layer of 3 nm in thickness was formed on the aluminum layer as a protective film. These layers may be formed on the opposite surface of the stamper 2' to the object to be imprinted 1. In this case, the diameter of the surface on which the aluminum layer is formed is same as the diameter of the object to be imprinted 1, and the ultraviolet light is projected from the outer edge of the stamper 2'.

In the first embodiment, multiple dielectric layers with different refractive indices may be formed on the aluminum layer to guide the ultraviolet light to the center of the object to be imprinted 1. Forming the dielectric layers on the opposite surface of the stamper 2' results in the same effect. Examples of a material for forming the dielectric layers include $SiO_2$, $Al_2O_3$, $TiO_2$, and $Ta_2O_5$.

Second Embodiment

Figure 2:
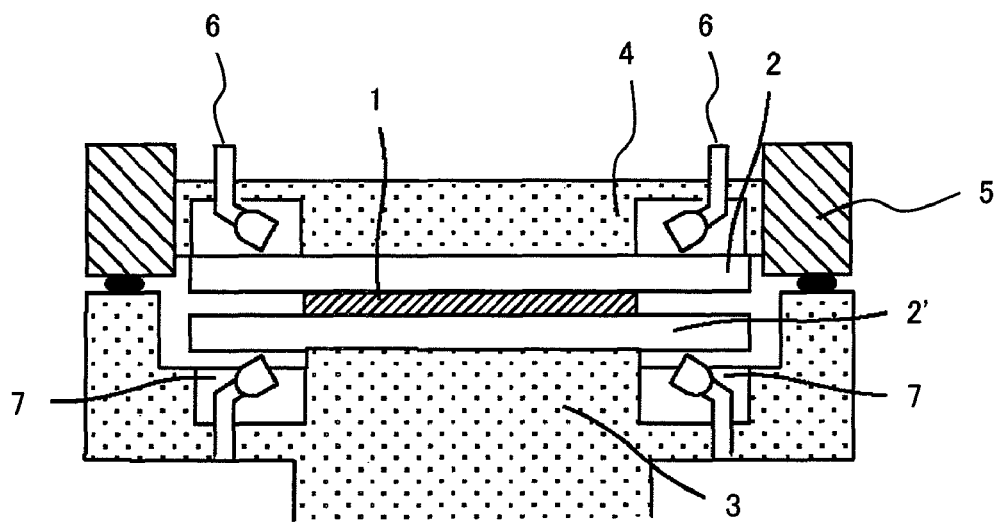
FIG. 2 is a schematic diagram of an imprinting device in accordance with a second embodiment of the present invention.

With reference to FIG. 2, description will be given to a second embodiment of the present invention. FIG. 2 illustrates an imprinting device in accordance with the second embodiment. In the second embodiment, description will be given only to the backup plate 4 and the UV light source 6 which are different from those in the first embodiment.

The backup plate 4 for holding the stamper 2 is made of stainless steel and has a mirrored surface. An aluminum layer of 1 μm in thickness was formed on the outermost surface of the stage 3 and a $SiO_2$ layer of 3 nm in thickness was formed on the aluminum layer as a protective film.

The backup plate 4 equips six UV light sources 6 for applying ultraviolet light from the outer edge of the stamper 2. The UV light sources 6 irradiates the stamper 2 with light of 365 nm that is projected from a laser diode, not shown in FIG. 2, through a fiber and a lens system. The six UV light sources 6 were disposed at intervals of 60 degrees to encircle the object to be imprinted 1.

By carrying out the same process as in the first embodiment, the object to be imprinted was manufactured with groove patterns having a width of 2 μm, a pitch of 4 μm, and a depth of 80 nm on both surfaces of it.

Third Embodiment

Figure 3:
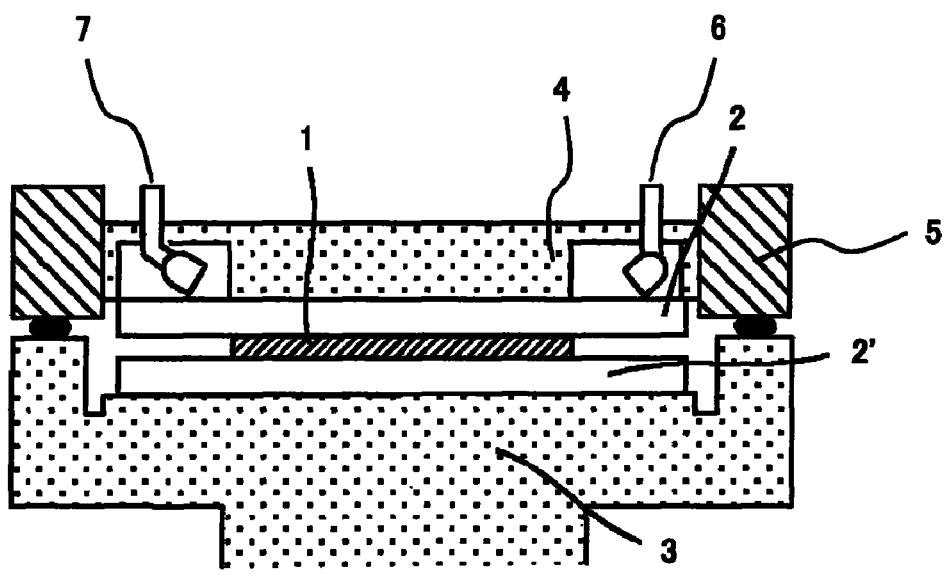
FIG. 3 is a schematic diagram of an imprinting device in accordance with a third embodiment of the present invention.

With reference to FIG. 3, description will be given to a third embodiment of the present invention. FIG. 3 illustrates an imprinting device in accordance with the third embodiment. In the third embodiment, description will be given only to the arrangement of the UV application mechanism which is different from that in the second embodiment.

The backup plate 4 made of stainless steel equips six UV light sources 6 and six UV light sources 7. The UV light sources 6 were adjusted to radiate the ultraviolet light to the stamper 2' and apply the ultraviolet light to the surface of the object to be imprinted 1 facing the stamper 2'. The six UV light sources 6 were disposed at intervals of 60 degrees to encircle the object to be imprinted 1. The UV light sources 7 were adjusted to radiate the ultraviolet light to the stamper 2 and apply the ultraviolet light to the surface of the object to be imprinted 1 facing the stamper 2. The positions of the six UV light sources 7 were deviated by 30 degrees from those of the six UV light sources 6, respectively.

By carrying out the same process as in the second embodiment, the object to be imprinted was manufactured with groove patterns having a width of 2 μm, a pitch of 4 μm, and a depth of 80 nm on both surfaces of it.

Fourth Embodiment

Figure 4:
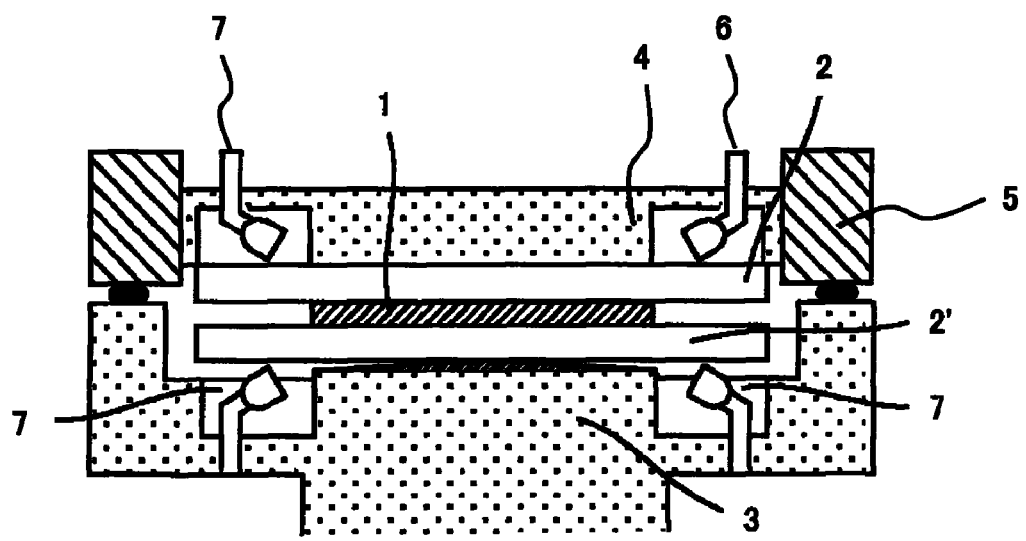
FIG. 4 is a schematic diagram of an imprinting device in accordance with a fourth embodiment of the present invention.

With reference to FIG. 4, description will be given to a fourth embodiment of the present invention. FIG. 4 illustrates an imprinting device in accordance with the fourth embodiment. In the fourth embodiment, description will be given only to the structure of the stage 3 which is different from that in the second embodiment.

As illustrated in FIG. 4, the imprinting device of the fourth embodiment includes the stage 3 that was made of stainless steel and movable up and down. The stage 3 had a silicone rubber layer with thickness of 0.5 mm (not shown in FIG. 4) on it as a buffer layer. The stamper 2' was placed on this buffer layer. The top surface of the stage 3 was curved and convex upward.

The pressing stage 3 in this embodiment can apply force to spread the resin layer from the center to the outer edge of the object to be imprinted 1, reducing the thickness of the thin film layer (base layer) of the fine patterns. By carrying out the same process as in the second embodiment, the object to be imprinted was manufactured with groove patterns having a width of 2 μm, a pitch of 4 μm, and a depth of 80 nm on both surfaces of it. The object to be imprinted also had a base layer having an average thickness of 10.3 nm.

In this embodiment, the curved surface of the stage 3 may be spherical and uniform in curvature. Otherwise, the curved surface may be aspherical with curvature larger in the area where fine patterns are imprinted than in the area outside the pattern-imprinted area. The most protruded position of the stage 3 is not limited to one point in the center of the pattern-imprinted area and it may be out of the center of the pattern-imprinted area. The most protruded portion of the stage 3 may be consisted of protrusions which define a closed region.

The buffer layer is an elastic layer formed on the curved surface of the stage 3 and is composed of a material having a lower elastic modulus than the material composing the stage 3, the object to be imprinted 1, and the stamper 2'. The buffer layer having such an elastic modulus can prevent the object to be imprinted 1 from being displaced during the pressing of the stamper 2' against the object to be imprinted 1. This buffer layer can be composed of, for example, a resin, such as polystyrene, polyimide, or polycarbonate, or a rubber containing silicone. This buffer layer may contain a release promoting material, such as fluorine, and may have a layer containing a release promoting material on the surface of it.

Fifth Embodiment

Figure 5A:
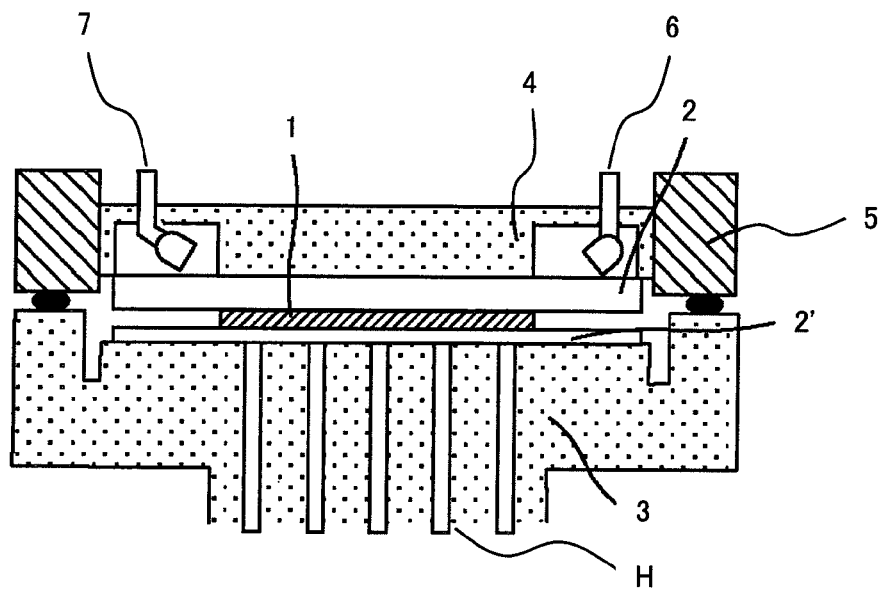
FIG. 5A is a schematic diagram of an imprinting device in accordance with a fifth embodiment of the present invention.
Figure 5B:
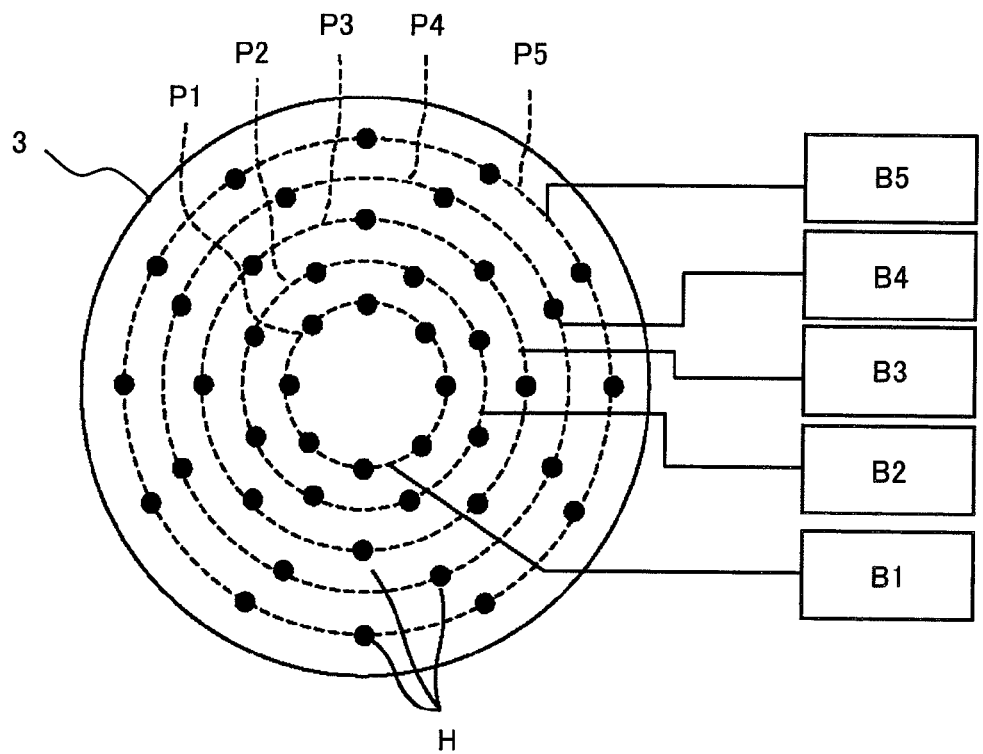
FIG. 5B is a top view of a pressing stage of the imprinting device in accordance with the fifth embodiment.

With reference to FIGS. 5A and 5B, description will be given to a fifth embodiment of the present invention. FIG. 5A illustrates an imprinting device in accordance with the fifth embodiment and FIG. 5B illustrates the top surface of a pressing stage 3 of the imprinting device. In the fifth embodiment, description will be given only to the structure of the stage 3 which is different from that in the third embodiment.

As illustrated in FIG. 5A, the top surface of the stage 3, where the stamper 2' is placed, is flat in the imprinting device in this embodiment. The imprinting device includes multiple flow paths H, each of which has an opening at the top surface of the stage 3. Pressurized fluid flows through the flow paths H.

As illustrated in FIG. 5B, the openings of the flow paths H are arranged in five concentric circles at the top surface of the stage 3. The flow paths H whose openings are arranged in the same concentric circle are connected to an identical pipe. Specifically, as illustrated in FIG. 5B, the flow paths arranged in the innermost concentric circle are connected to an annular pipe P1. The flow paths arranged in each concentric circle outside the innermost concentric circle are connected to annular pipes P2, P3, P4, and P5 respectively and sequentially toward the outside of the stage 3. These pipes P1, P2, P3, P4, P5 are disposed inside an elevating mechanism, not shown in FIGS. 5A and 5B. As illustrated in FIG. 5B, the pipes P1, P2, P3, P4, P5 are respectively connected to pressure regulating mechanisms B1, B2, B3, B4, B5 for regulating the pressures of fluid flowing through the pipes P1, P2, P3, P4, P5. The pressure regulating mechanisms B1, B2, B3, B4, B5 regulate pressures of fluid spouted from the openings of the flow paths H in the respective concentric circles.

In this embodiment, the quantities of spouted nitrogen obtained from the respective pressure regulation systems were controlled and each pressure of spouted nitrogen was set to 0.5 MPa, 0.5 MPa, 0.45 MPa, 0.4 MPa, and 0.4 MPa from the center of the stage. In this case, a concentric pressure contour distribution was obtained in which the pressure was the maximum in the innermost of the object to be imprinted 1 and was gradually decreased toward the outer edge of the object to be imprinted 1.

By carrying out the same process as in the third embodiment, the object to be imprinted was manufactured with groove patterns having a width of 2 μm, a pitch of 4 μm, and a depth of 80 nm on both surfaces of it. The object to be imprinted also had a base layer having a thickness of 20 nm or less.

Sixth Embodiment

In this embodiment, a object to be imprinted was manufactured with fine patterns for large-capacity magnetic recording media (discrete track media) imprinted by the same method as in the fifth embodiment.

In the object to be imprinted 1, a magnetic recording media formation layer was formed beforehand by a known DC magnetron sputtering method. The magnetic recording media formation layer included a precoat layer, a magnetic domain control layer, a soft magnetic underlayer, an intermediate layer, and a vertical recording layer.

Patterns consisting of lines having width of 50 nm, depth of 100 nm, and pitch of 100 nm, arranged concentrically were formed on the stampers 2, 2' by a known electron beam direct lithography method. In this case, the stampers were disposed for the concentric grooves to have the common central axis with the center hole of the object to be imprinted 1.

Figure 7:
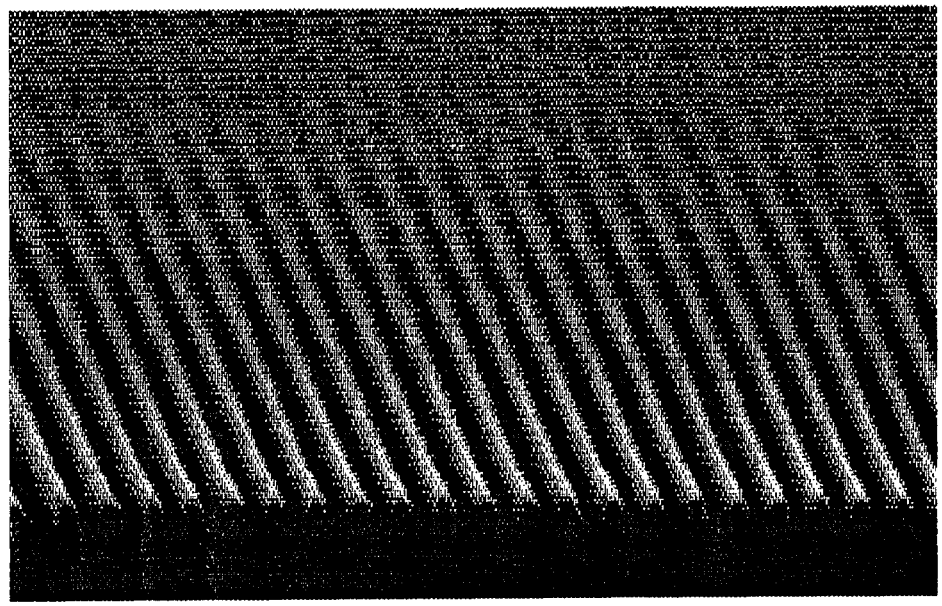
FIG. 7 is an electron microscope image showing imprinting patterns prepared in a sixth embodiment of the present invention.

By the same method as in the fifth embodiment, the object to be imprinted 1 was manufactured with imprinted patterns of concentric lines on both surfaces of it. The lines had a width of 50 nm, a depth of 110 nm, and a pitch of 100 nm, corresponding to the fine patterns formed on the surfaces of the stampers 2 and 2'. FIG. 7 is an electron microscope image showing the imprinting patterns.

Seventh Embodiment

In this embodiment, a object to be imprinted was manufactured with fine patterns for large-capacity magnetic recording media (bit patterned media) imprinted by the same method as in the sixth embodiment.

Patterns consisting of holes having diameter of 25 nm, depth of 60 nm, and pitch of 45 nm, arranged concentrically were formed on the stampers 2, 2'. In this case, the stampers were disposed for the concentric grooves to have the common central axis with the center hole of the object to be imprinted 1.

Figure 8:
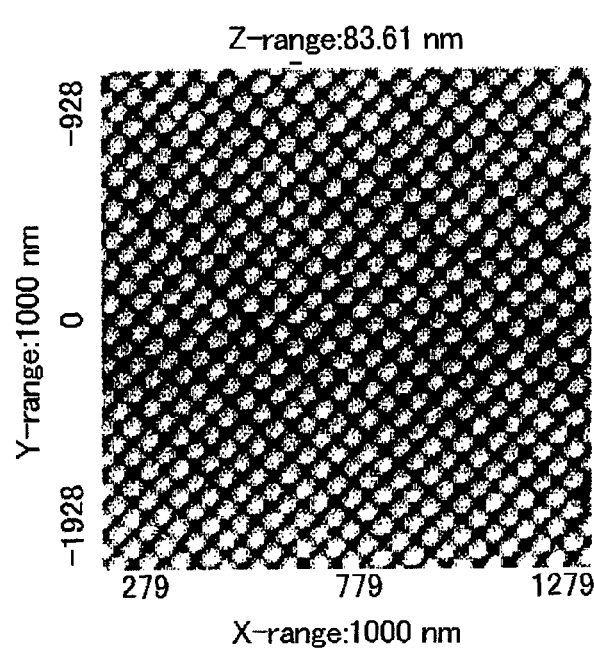
FIG. 8 is anatomic force microscope image showing a section of imprinting patterns prepared in a seventh embodiment of the present invention.

By the same method as in the sixth embodiment, the object to be imprinted 1 was manufactured with imprinted patterns of concentric columnar structures on both surfaces of it. The columnar structures had a diameter of 25 nm, a depth of 60 nm, and a pitch of 45 nm, corresponding to the fine patterns formed on the surfaces of the stampers 2 and 2'. FIG. 8 is an atomic force microscope image showing the imprinting patterns.

Eighth Embodiment

Figure 9A:
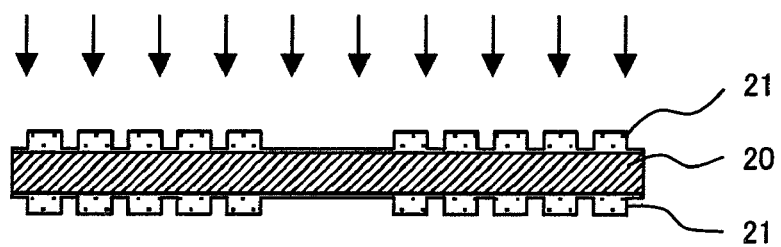
FIG. 9A illustrates a first step of the manufacturing process of the discrete track media in an eighth embodiment.
Figure 9B:
FIG. 9B illustrates a second step of the manufacturing process of the discrete track media in the eighth embodiment.
Figure 9B:
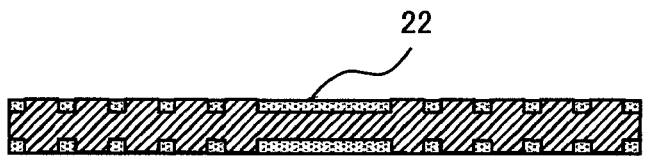

With respect to FIGS. 9A to 9C, description will be given to a method of manufacturing the discrete track media in the sixth embodiment, using the object to be imprinted 1 with the fine patterns imprinted to both surfaces of it. FIGS. 9A to 9C illustrate steps of the manufacturing process of the discrete track media.

First, a object to be imprinted was manufactured as in the sixth embodiment. FIG. 9A shows a substrate 20 of the object to be imprinted with resist patterns 21 on both surfaces of it. The surface shapes of the stampers 2, 2' were imprinted on the resist patterns 21, which were composed of a photo-curing resin.

Next, using the resist patterns 21 as a mask, only the vertical recording layers on surfaces of the substrate 20 were processed by a known milling method. One surface was processed at a time by the milling method. As a result, the projections and depressions corresponding to the resist patterns 21 were produced on both surfaces of the substrate 20 as illustrated in FIG. 9B. In this milling, argon-based gas was used. Before the milling was carried out, the base layers of the resist patterns were removed by fluorine-based gas to expose the portions of the substrate surface corresponding to the depressions of the patterns.

Next, as illustrated in FIG. 9C, non-magnetic material layer 22 was given to the substrate 20, whose surfaces, the projections and depressions had been formed on them, were flattened. As a result, a discrete track medium was obtained, equivalent to a surface recording density of 200 Gbpsi.

What is claimed is:

1. An imprinting device comprising:
   a stamper having a fine pattern on a surface, and configured to imprint the fine pattern onto a surface of an object when pressed against the object, the object including a substrate and a photo-curing resin layer formed on the substrate; and
   a light source, configured to apply light to the photo-curing resin layer of the object when the stamper imprints the fine pattern of the stamper onto the photo-curing resin layer of the object, thereby curing the photo-curing resin layer of the object;
   wherein the light source is disposed such that the stamper is between the light source and the object, and the light source is configured to apply light to the stamper in an oblique direction and at a predetermined incident angle to the surface of the stamper with the fine pattern; and
   an additional light source, to form a plurality of light sources, wherein the plurality of light sources are installed around a periphery of the stamper, in a plane parallel with the surface of the stamper including the fine pattern, and are installed to apply light to the stamper in at least two different directions.

2. The imprinting device according to claim 1,
   wherein an outside diameter of the stamper is larger than an outside diameter of the substrate, and the light from the light source enters a peripheral portion of the stamper where the substrate and the stamper are not in contact with each other.

3. The imprinting device according to claim 1,
   wherein the stamper has a light reflection layer for reflecting the light on a surface of the stamper, and the light reflection layer is provided with the surface opposite to a surface being brought into contact with the substrate.

4. The imprinting device according to claim 1,
   wherein the stamper has a light guide layer for guiding the light on a surface of the stamper, and the light guide layer is provided with the surface opposite to a surface being brought into contact with the substrate.

5. The imprinting device according to claim 1, further comprising a stage for pressing the stamper against the substrate,
   wherein the stage has a light reflection layer for reflecting the light on a surface of the stage.

6. The imprinting device according to claim 1, further comprising a stage for pressing the stamper against the substrate,
   wherein the stage has a light guide layer for guiding the light on a surface of the stage.

7. An imprinting device comprising:
   a pair of stampers, each stamper having a fine pattern on a surface thereof, and each stamper configured to imprint the respective fine pattern thereof onto a photo-curing resin layer of an object when pressed against the object, the object including a substrate and a pair of photo-curing resin layers formed on opposing sides of the substrate; and a plurality of light sources, each light source configured to apply light to a photo-curing resin layer of the object when a stamper imprints a fine pattern onto said photo-curing resin layer of the object, thereby curing said photo-curing resin layer of the object;

wherein a light source is disposed such that the stamper is between the light source and the object, and the light source is configured to apply light to the stamper in an oblique-direction at a predetermined incident angle to the surface of the stamper having the fine pattern;

wherein light sources are installed around a periphery of each of the stampers, in a plane parallel with the surfaces of the stampers including the fine patterns, and are installed to apply light to each of the stampers in at least in two different directions.

8. The imprinting device according to claim 7, wherein outside diameters of the stampers are larger than an outside diameter of the substrate, and the light from the light sources enter a peripheral portion of the stampers where the substrate and the stampers are not in contact with each other.

9. The imprinting device according to claim 7, wherein the stampers have light reflection layers for reflecting the light on a surface of the stampers, and each of the light reflection layers is provided with the surface opposite to a surface being brought into contact with the substrate.

10. The imprinting device according to claim 7, wherein the stampers have light guide layers for guiding the light on a surface of the stamper, and each of the light guide layers is provided with the surface opposite to a surface being brought into contact with the substrate.

11. The imprinting device according to claim 7, further comprising a stage for pressing one of the stampers against the substrate, wherein the stage has a layer for reflecting light on it.

12. The imprinting device according to claim 7, further comprising a stage for pressing one of the stampers against the substrate, wherein the stage has a light guide layer for guiding the light on a surface of the stage.

* * * * *